United States Patent
Kikuchi

Patent Number: 5,812,646
Date of Patent: Sep. 22, 1998

[54] SWITCHING CONTROLLER WITH SUPERVISORY MODE FOR COMMUNICATION TERMINALS

[75] Inventor: Akio Kikuchi, Tokyo, Japan

[73] Assignee: Oki Data Corporation, Tokyo, Japan

[21] Appl. No.: 630,797

[22] Filed: Apr. 10, 1996

[30] Foreign Application Priority Data

Apr. 26, 1995 [JP] Japan ................................. 7-125848

[51] Int. Cl.⁶ ................................................ H04M 11/00
[52] U.S. Cl. ...................................... 379/100.16; 379/93.09
[58] Field of Search .............................. 379/93.09, 93.11, 379/100.15, 100.16, 102.02, 102.01; 358/434, 435, 436, 438, 439, 442, 443

[56] References Cited

U.S. PATENT DOCUMENTS

| | | | |
|---|---|---|---|
| 4,987,586 | 1/1991 | Gross et al. | 379/93.09 |
| 5,086,453 | 2/1992 | Senoo et al. | 379/93.09 |
| 5,086,455 | 2/1992 | Satomi et al. | 379/100.16 |
| 5,444,771 | 8/1995 | Ohnishi | 379/100.16 |

*Primary Examiner*—Stella Woo
*Attorney, Agent, or Firm*—Panitch Schwarze Jacobs & Nadel, P.C.

[57] ABSTRACT

A switching controller controls two switches, which connect a first communication terminal such as a telephone set and a second communication terminal such as a facsimile machine to the same communication line. Under certain conditions, such as when the second communication terminal originates or answers a call for the first communication terminal, the switching controller monitors the status of the first communication terminal and automatically disconnects the second communication terminal from the communication line responsive to that status. For a telephone set, the monitored status is the on-hook/off-hook status.

14 Claims, 6 Drawing Sheets

SWITCHING CONTROLLER WITH SUPERVISORY MODE FOR COMMUNICATION TERMINALS

BACKGROUND OF THE INVENTION

The present invention relates to a switching controller for efficiently switching between different communication terminals, such as a facsimile machine and a telephone set, which are coupled to the same communication line.

Facsimile machines have become widespread in both business offices and private homes. In many cases the facsimile machine is coupled to the same telephone line as a telephone set, either a telephone set built into the facsimile machine or a separate telephone set. A switching controller switches the line connection between the facsimile machine and telephone set.

Conventional switching controllers permit switching of a call between the facsimile machine and telephone set while the call is in progress, by means of a keypad operation. This function enables the user to originate a call on-hook by dialing at the facsimile machine, waiting for the called party to answer, listening to the called party's voice through a loudspeaker in the facsimile machine, then picking up the telephone handset, pressing the necessary key or keys on the keypad to transfer the call from the facsimile machine to the telephone set, and conversing through the telephone set. If the user forgets the keypad operation or performs it incorrectly, however, the call will fail to be transferred.

The facsimile machine generally has the capability to answer a call placed by a distant facsimile machine automatically, so that a facsimile transmission can be received without user intervention. If the facsimile machine is set to this auto-answer mode when a voice call arrives, however, the human caller at the other end of the line will be greeted by a facsimile tone signal. To receive the voice call, the user must both pick up the telephone handset and perform a keypad operation to switch the call from the facsimile machine to the telephone set. In many cases the distant party hangs up before the switchover can be completed.

It is also possible for the user to originate a call off-hook by picking up the telephone handset, then dialing at the facsimile machine. While waiting for the facsimile machine to send the dialed digits, or waiting for the called party to answer, the user may realize that he has dialed the wrong number, or for some other reason may decide to cancel the call. This requires yet another key operation at the facsimile machine. If the user simply replaces the telephone handset, the facsimile machine will continue dialing, or continue waiting for an answer.

Conventional switching controllers thus require a variety of keypad operations, which are annoying to many users and are a common source of confusion and mistakes.

Similar problems occur with telephone sets and computers, or more generally when any two communication terminals are connected to the same communication line.

SUMMARY OF THE INVENTION

It is accordingly a general object of the present invention to simplify the transfer of a line connection from one communication terminal to another, when two communication terminals are coupled to the same communication line.

A more specific object of the invention is to enable a person to originate a voice call from a facsimile machine, then transfer the call to a telephone set simply by picking up the telephone handset.

Another specific object is to enable a person to answer a voice call arriving at a facsimile machine simply by picking up a telephone handset.

A further specific object is to enable a person to originate a call from a facsimile machine while holding a telephone handset off-hook, then cancel the call simply by replacing the handset.

The invented switching controller has two switches for connecting a first communication terminal and a second communication terminal to a communication line, and a detector for detecting the status of the first communication terminal. Under certain conditions, the switching controller sets the switches to connect both the first and second communication terminals to the communication line, then detects the status of the first communication terminal, and disconnects the second communication terminal from the communication line responsive to this status.

When the first communication terminal is a telephone set and the second communication terminal is a facsimile machine, the status detected is the hook status of the telephone set. The facsimile machine is disconnected when the telephone set goes off-hook for voice communication in a call either originated by or answered by the facsimile machine. If the facsimile machine originates a call while the telephone set is already off-hook, the facsimile machine is disconnected if the telephone set goes on-hook while the facsimile machine is sending dial signals.

DETAILED DESCRIPTION OF THE INVENTION

An embodiment of the invention will be described with reference to the attached illustrative drawings.

Figure 1:
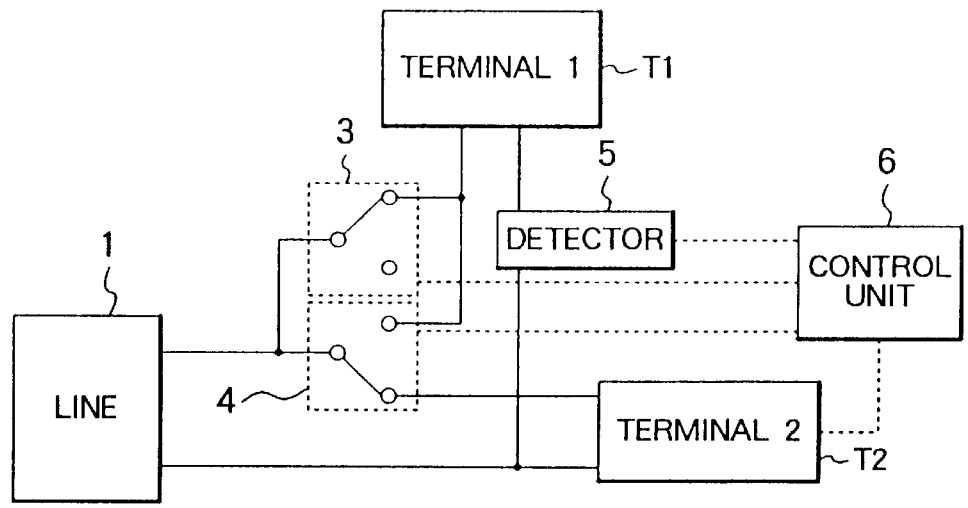
FIG. 1 is a connection diagram showing the general connection configuration of the invented switching controller, with switches set to a supervisory mode.

FIG. 1 is a connection diagram showing how the invented switching controller couples a communication line 1 to a first communication terminal T1 and a second communication terminal T2. The switching controller comprises a bypass switch 3, a main switch 4, a detector 5, and a control unit 6. The communication line 1 has a two-wire current-loop interface to the communication terminals T1 and T2.

The main switch 4 is controlled by the control unit 6 and has two states. In the state shown, the main switch 4 sets up an electrical loop that connects communication line 1 to the second communication terminal T2. In its other state, main switch 4 opens this loop and sets up a different loop connecting communication line 1 to the first communication terminal T1.

Bypass switch 3 is also controlled by the control unit 6, and has an on-state and an off-state. In the on-state, bypass switch 3 sets up a bypass loop connecting the first communication terminal T1 to the communication line 1, as illustrated, regardless of the state of main switch 4. In the off-state, bypass switch 3 opens this bypass loop.

Switches 3 and 4 are connected in parallel between the communication line 1 and first communication terminal T1, and the loops connecting communication line 1 to communication terminal T1 through these switches have a common return path. Detector 5 is inserted in this common return path, and detects current flow between the communication line 1 and first communication terminal T1 on either the main loop through switch 4 or the bypass loop through switch 3. Detector 5 notifies the control unit 6 of the status of the first communication terminal T1 by indicating whether a flow of loop current is present or not.

Control unit 6 is, for example, a microcontroller that receives the output of detector 5 and controls switches 3 and 4. Control unit 6 may also provide the second communication terminal T2 with information indicating the settings of switches 3 and 4.

Figure 2:
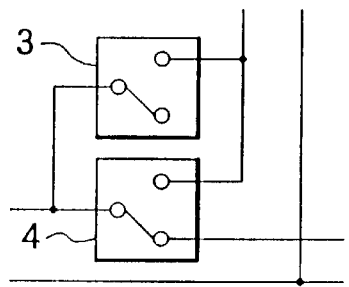
FIG. 2 illustrates another mode setting of the switches in FIG. 1.
Figure 3:
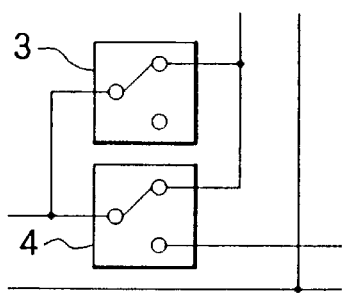
FIG. 3 illustrates another mode setting of these switches.

Switches 3 and 4 can be set to three modes. FIG. 1 illustrates the supervisory mode, in which communication line 1 is coupled through bypass switch 3 to the first communication terminal T1, and through main switch 4 to the second communication terminal T2. FIG. 2 illustrates a second mode, in which the bypass switch 3 is off and the communication line 1 is coupled only through main switch 4 to the second communication terminal T2. FIG. 3 illustrates a third mode, in which the main switch 4 couples communication line 1 to the first communication terminal T1. Bypass switch 3 may be either on or off in the third mode.

To summarize the three modes, the communication line 1 may be coupled to the first communication terminal T1 alone, or to the second communication terminal T2 alone, or to both communication terminals T1 and T2.

Although shown as separate in FIG. 1, the switching controller, comprising the switches 3 and 4, detector 5, and control unit 6, may be incorporated into either the first or second communication terminal T1 or T2. An embodiment in which the two communication terminals are a telephone set and a facsimile machine and the switching controller is incorporated into the facsimile machine will be described next.

Figure 4:
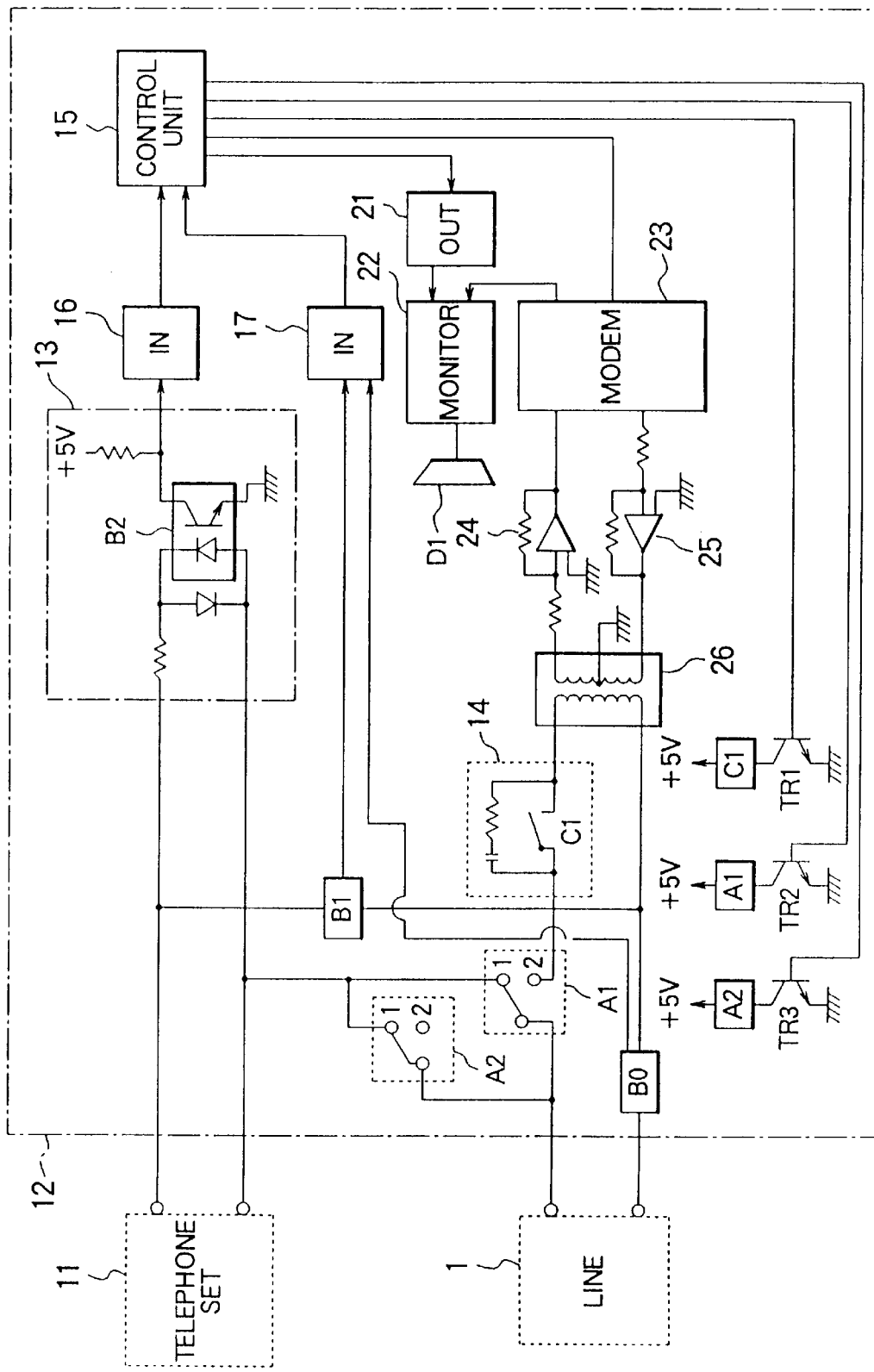
FIG. 4 is a schematic diagram showing an embodiment of the invention.

Referring to FIG. 4, the telephone set 11 plays the role of the first communication terminal T1 in FIG. 1, while the facsimile machine 12 plays the role of the second communication terminal T2. The communication line 1 is an ordinary telephone line. The facsimile machine 12 is coupled directly to the telephone line 1; the telephone set 11 is coupled to the telephone line 1 through the facsimile machine 12.

The telephone set 11 may be a handset which is cradled in the facsimile machine 12, and uses the dialing facilities of the facsimile machine 12, or the telephone set 11 may have its own independent cradle and dial. The switching controller operates in the same way in both cases.

For performing its facsimile functions, the facsimile machine 12 has a scanner, a printer, a modulator-demodulator or modem, and various associated circuits, which form what will be referred to as the facsimile apparatus. Most of this facsimile apparatus is not visible in FIG. 4. The facsimile machine 12 also contains the invented switching controller. Inside the facsimile machine 12, the telephone set 11 and facsimile apparatus are coupled in parallel to the telephone line 1 by the switching controller, more specifically by a pair of switches A1 and A2.

Switch A1, which is equivalent to the main switch 4 in FIG. 1, can be set to a first position (1) coupling the telephone line 1 to the telephone set 11, or a second position (2) coupling the telephone line 1 to the facsimile apparatus. Switch A2, which is equivalent to the bypass switch 3 in FIG. 1, can be set to a first position or on-position (1) coupling the telephone line 1 to the telephone set 11, or to a second position or off-position (2) in which this coupling is not made.

A first detector B1, equivalent to detector 5 in FIG. 1, is inserted in the current loop between the telephone line 1 and telephone set 11 to detect the hook status (on-hook or off-hook) of the telephone set 11. The off-hook status is detected from the presence of current flow, and the on-hook status from the absence of such flow. Detector B1 operates only when switch A1 or A2 is set to the position (1) coupling the telephone line 1 to the telephone set 11. A second and similar detector B0 is inserted in the current loop between the telephone line 1 and the facsimile apparatus.

The facsimile machine 12 also has a ringing detector 13, coupled in parallel with the telephone set 11, to detect ringing signals when a call is received, and a dialer 14 for generating dial pulses when a call is originated. The detector element, denoted B2, in the ringing detector 13 is a well-known device comprising a diode and a bipolar transistor. The dialer 14 is inserted in the current loop connecting the telephone line 1 to the facsimile apparatus, between the main switch A1 and the facsimile apparatus.

All operations of the facsimile machine 12, including operation of switches A1 and A2, are controlled by a control unit 15, which subsumes the functions of control unit 6 in FIG. 1. The control unit 15 has an input port 16 for receiving a ringing detection signal from the ringing detector 13, another input port 17 for receiving current detection signals from detectors B0 and B1, and an output port 21 coupled to a monitor circuit 22. The control unit 15 is also coupled to the base electrodes of three bipolar transistors TR1, TR2, and TR3 which drive the dialer 14 and switches A1 and A2, respectively. Switch A2 is coupled in series between transistor TR3 and a power-supply (+5 V) node, switch A1 is coupled in series between transistor TR2 and another power-supply node, and a switch C1 in the dialer 14 is coupled in series between transistor TR1 and another power-supply node.

The monitor circuit 22 also receives signals from the above-mentioned modem 23, and drives a loudspeaker D1. The modem 23 is coupled to the telephone line 1 through an input amplifier 24, an output amplifier 25, and a transformer 26, all of which are part of the facsimile apparatus. This configuration enables either voice or facsimile signals to be received by the modem 23, supplied to the monitor circuit 22, and reproduced through the loudspeaker D1.

Figure 5:
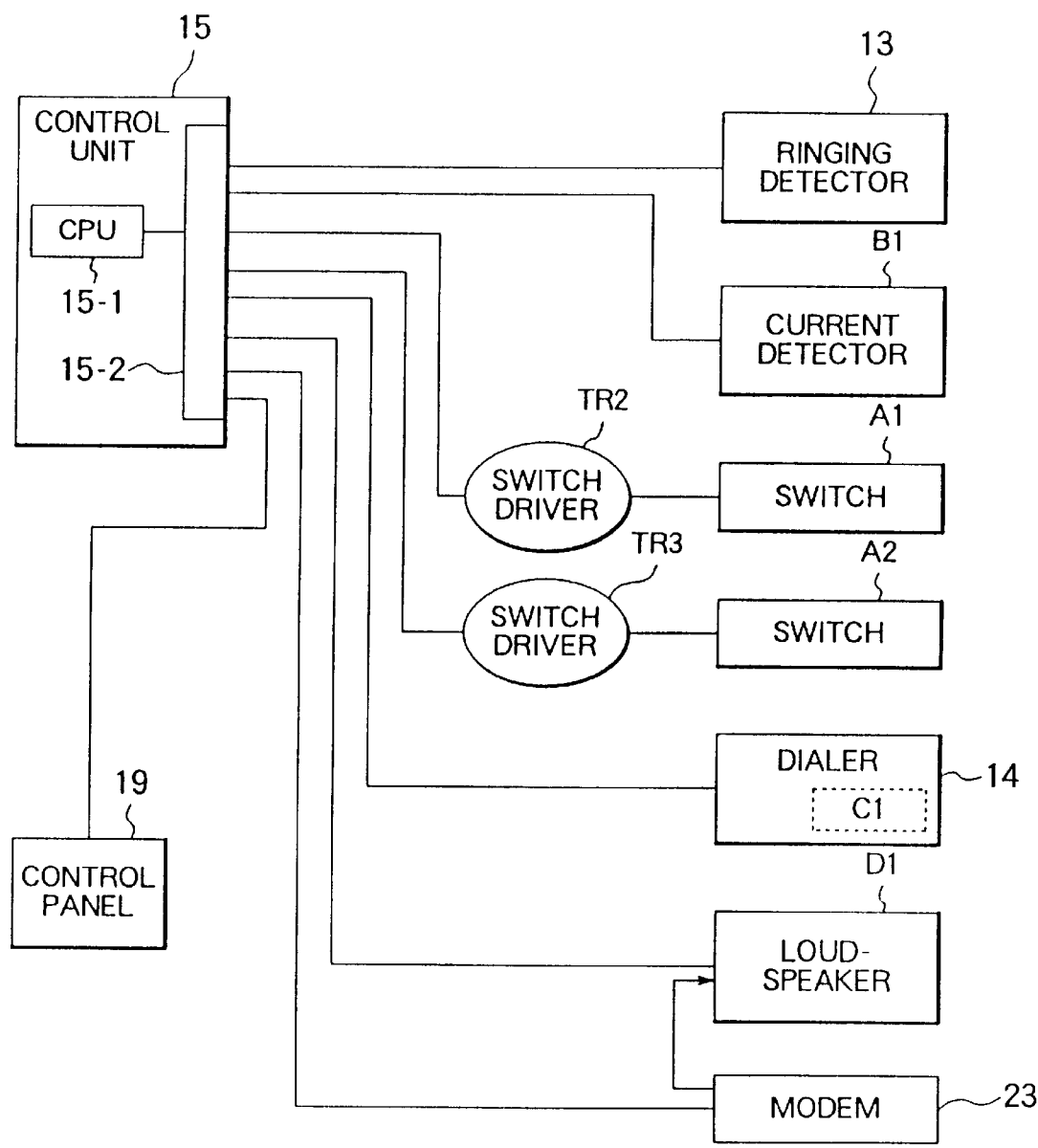
FIG. 5 is a block diagram of the control system in the embodiment.

FIG. 5 shows the control system of the embodiment in the form of a block diagram.

The control unit 15 has a central processing unit (CPU) 15-1, and interface circuitry 15-2 which includes the input and output ports 16, 17, and 21 shown in FIG. 4, as well as other input and output ports. The ringing detector 13, current detector B1, dialer 14, loudspeaker D1, modem 23, and other components are directly connected to the interface circuitry 15-2. Switches A1 and A2 are coupled to the interface circuitry 15-2 through transistors TR2 and TR3 as described above. Also coupled to the interface circuitry 15-2 is a control panel 19 with a telephone dial or keypad, an off-hook key, and other keys and control switches (not visible) by which the user operates the facsimile machine.

Three operations of this embodiment will be explained with reference to the flowcharts in FIGS. 6 to 8.

Figure 6:
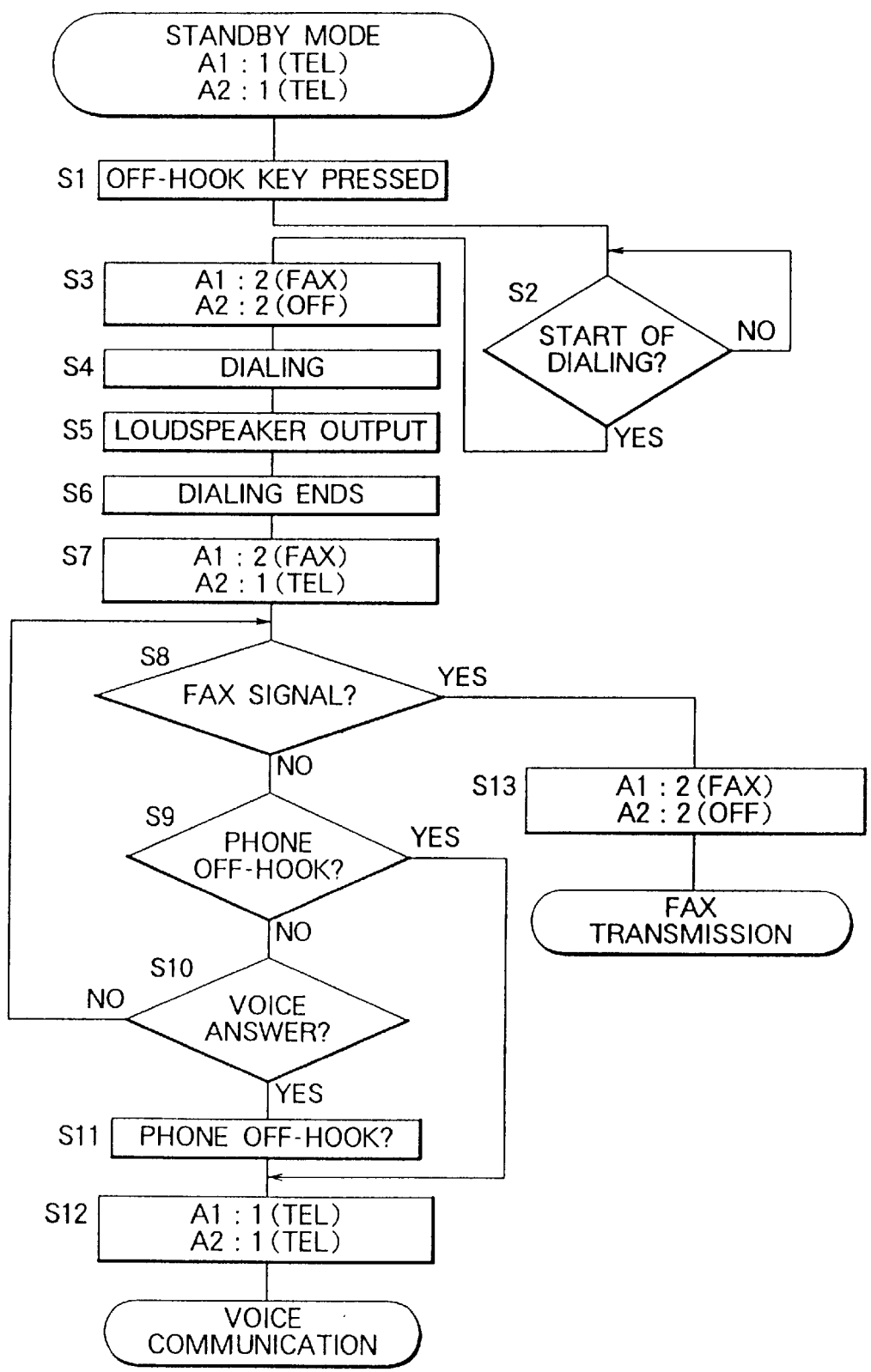
FIG. 6 is a flowchart illustrating an on-hook dialing process.
Figure 7:
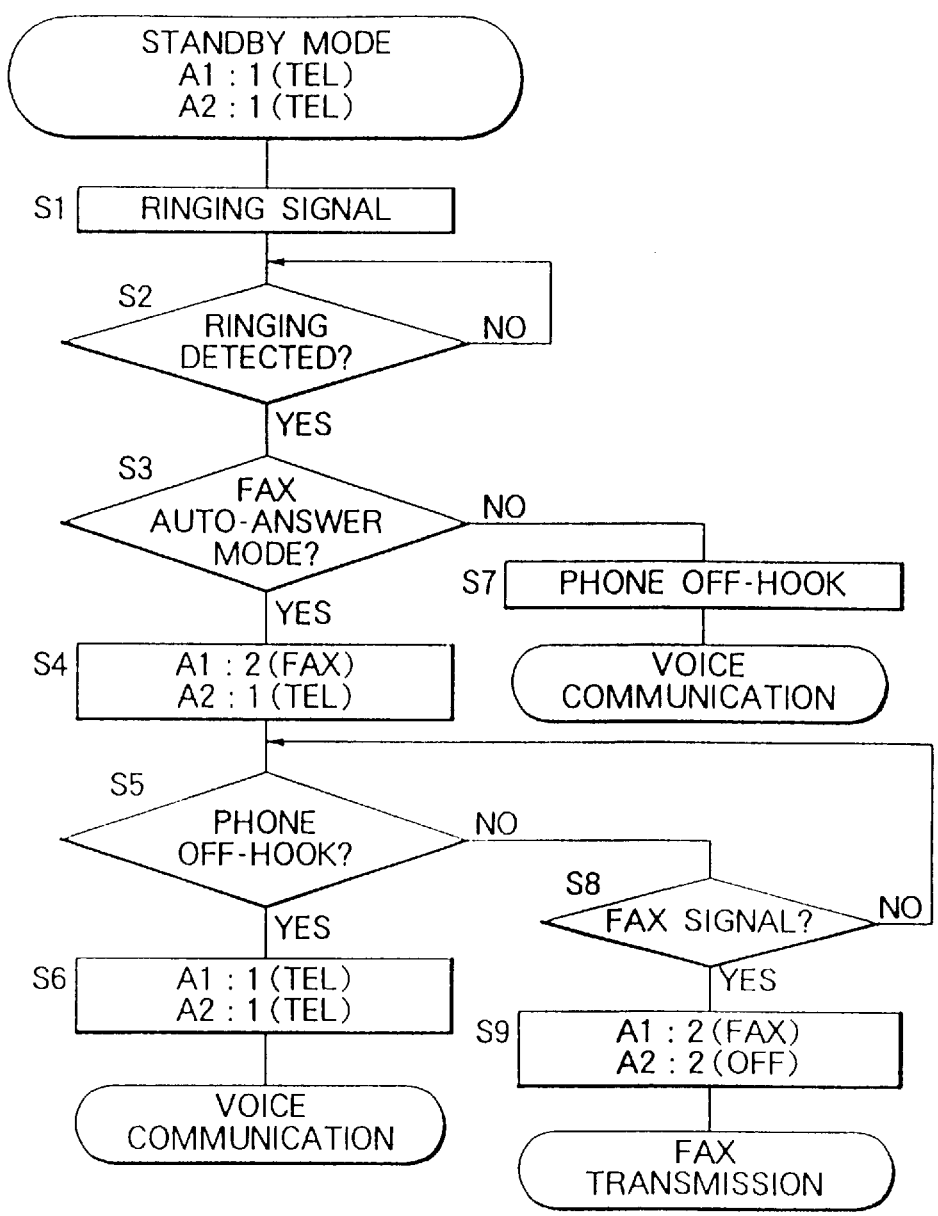
FIG. 7 is a flowchart illustrating an answering process.

FIG. 6 is a flowchart of the operation of originating a call from the facsimile machine 12. This operation will first be described for the case of a voice call, in which the user dials at the facsimile machine 12, then picks up the telephone handset.

The facsimile machine 12 is initially in a standby mode in which the main switch is set to the first position (1) or telephone position, enabling the user to use the telephone set 11 as a normal telephone set. The bypass switch A2 may be either on or off in this mode, but is shown in FIG. 6 as being set to the on-position (1) or telephone position.

In step S1, the user presses the off-hook key on the control panel 19 of the facsimile machine 12. This operation closes switch C1 in the dialer 14, placing the facsimile machine 12 in the off-hook state. In step S2, the control unit 15 waits for the user to operate the dial or press further keys on the control panel 19, designating the telephone number of the party to be called. When such input occurs, in step S3 the control unit 15 outputs signals to transistors TR2 and TR3 that set the main switch A1 to the facsimile position (2) and the bypass switch A2 to the off-position (2). The telephone line 1 is now coupled to the facsimile apparatus in an electrical loop, and disconnected from the telephone set 11. The telephone set 11 must be disconnected during dialing so that the telephone switching office can detect the dial pulses generated by the dialer 14.

The dialing is carried out by the dialer 14 under control of the control unit 15 in step S4, by controlling switch C1. In step S5, the control unit 15 switches on the monitor circuit 22 so that the line status can be monitored at the loudspeaker D1. When the called party answers, his voice will be heard through the loudspeaker D1. The dialing process ends in step S6.

In the next step S7, the control unit 15 leaves the main switch A1 set to the facsimile position (2) and sets the bypass switch A2 to the on-position or telephone position (1), so that both the facsimile apparatus and telephone set 11 are coupled to the telephone line 1. The switching controller now operates in the supervisory mode, in which the control unit 15 monitors the status of the telephone set 11 and takes appropriate action.

In step S8, the control unit 15 determines whether the modem 23 is receiving a valid facsimile signal. This determination is made from a signal that the control unit 15 receives from the modem 23. In the present example a valid facsimile signal is not received, so the control unit 15 proceeds to step S9 and determines whether the telephone set 11 is off-hook. This determination is made by monitoring the current detection signal from detector B1. If the telephone set 11 is off-hook, the control unit 15 proceeds to step S12, which will be described in a moment.

Steps S10 and S11 are performed by the user. In step S10 the user determines from the loudspeaker output whether the call has been answered by a human voice. If this is not the case, the user need take no action, and the process returns to step S8. When a human voice is heard, in step S11 the user picks up the handset of the telephone set 11. The telephone set 11 is now in the off-hook state, which is detected by the control unit 15 in step S9, and the process proceeds to step S12.

In step S12, the control unit 15 sets the main switch A1 to the telephone position (1), disconnecting the facsimile apparatus from the telephone line 1, and the facsimile machine 12 reverts to the standby mode, while the user converses with the called party using the telephone set 11.

Steps S8, S9, and S10 form a loop that repeats until either a facsimile signal is received or the telephone set 11 goes off-hook. Step S9, or steps S8 and S9, may be carried out once or many times between steps S10 and S11, although this is not explicitly shown in the drawing.

In this way the user is able to dial a call at the facsimile machine 12, wait hands-free until the call is answered, then simply pick up the telephone handset and start speaking, without having to press a key or perform any other operations to switch the call from the facsimile machine 12 to the telephone set 11. The call can be made in a completely natural and intuitive way, with no opportunities for mistakes.

If the user places a call to a distant facsimile machine instead of to a telephone set, the call will be answered by a facsimile signal, which will be detected in step S8. The control unit 15 then proceeds to step S13, in which the main switch A1 is left at the facsimile position and the bypass switch A2 is turned off. Following step S13, the facsimile machine 12 can send a facsimile transmission. Turning off the bypass switch A2 keeps the facsimile transmission from being disrupted by current flow in the telephone set 11.

Next the operation of answering a call will be explained with reference to FIG. 7. In this operation, the facsimile machine 12 may be in either of two answering modes: an auto-answer mode or a manual-answer mode.

The switching controller is initially in the standby mode, with switches A1 and A2 both set to the telephone position. (As mentioned before, the bypass switch A2 may be off.) In step S1, a ringing signal arrives on the telephone line 1 and is routed via switches A1 and A2 to the ringing detector 13, where it is detected by detector element B2. Meanwhile, the control unit 15 is waiting in step S2 for input of a detection signal from the ringing detector 13. When this detection signal arrives, the control unit 15 proceeds to step S3.

In step S3, the control unit 15 determines whether the facsimile machine 12 is set to the auto-answer mode. In auto-answer mode, the control unit 15 proceeds in step S4 to set the main switch A1 to the facsimile position (2) and the bypass switch A1 to the telephone position or on-position (1). The switching controller is now in the supervisory mode. The control unit 15 also drives transistor TR1 so that switch C1 in the dialer 14 closes, placing the facsimile apparatus in the off-hook state. This is detected at the telephone switching office, and ringing signals cease to arrive.

In step S5, the control unit 15 determines, from the signal received from detector B1, whether the telephone set 11 is off-hook. If the telephone set is off-hook, indicating that the user has picked up the handset to answer the call, the control unit 15 proceeds in step S6 to set both switches A1 and A2 to the telephone position (1), disconnecting the facsimile apparatus from the telephone line 1 and enabling the user to converse with the distant party by voice.

If the telephone set 11 is not off-hook in step S5, the control unit 15 determines in step S8 whether a valid facsimile signal has been received, as reported by the modem 23. If a valid facsimile signal has been received, the control unit proceeds, in step S9, to set the main switch A1 to the facsimile position (2) and the bypass switch A2 to the off-position (2), so that a facsimile transmission can be received without interference from the telephone set 11.

If a valid facsimile signal has not been received, the control unit 15 returns from step S8 to step S5, and continues to alternate between steps S5 and S8 until either the user picks up the telephone handset or a facsimile signal arrives.

If the calling party is a distant facsimile machine, a facsimile signal will be received with substantially no delay after step S4, normally while the telephone set 11 is still on-hook, so the operation will proceed quickly through steps S5, S8, and S9 to enable the facsimile transmission to begin.

If the calling party is human, after the facsimile machine 12 goes off-hook, the user may hear the calling party's voice through the loudspeaker D1, or may simply fail to hear an incoming facsimile tone. In either case, the user will pick up the telephone handset, causing the control unit to proceed from step S5 to step S6 and set switches A1 and A2 for voice communication.

If the facsimile machine 12 is set to the manual-answer mode, the control unit 15 takes no further action after step S3, leaving the user to answer the call by picking up the telephone handset in step S7. In this case the facsimile apparatus remains on-hook, and switches A1 and A2 remain set to the telephone position (1). The call is answered like a call to an ordinary telephone set, as if the facsimile machine 12 were not present.

Regardless of whether the facsimile machine 12 is set to the auto-answer mode or manual-answer mode, the user can thus answer a call from a human caller simply by picking up the telephone handset, without having to press a key or perform any other control-panel operations.

Next the procedure followed in originating a call from the facsimile machine 12 with the telephone set 11 in the off-hook state will be described, with reference to FIG. 8. The difference between this procedure and the one in FIG. 6 is that the user starts by picking up the telephone handset, instead of pressing the off-hook key on the facsimile machine 12.

This procedure also begins in the standby mode, with switches A1 and A2 both set to the telephone position (1). In step S1, the user picks up the telephone handset. This is detected by current detector B1, which notifies the control unit 15. In step S2, the control unit 15 waits for the user to start dialing at the control panel 19 of the facsimile machine 12. When the first digit is dialed, the control unit 15 proceeds to step S3, in which the main switch A1 is set to the facsimile position (2) and the bypass switch A2 is turned off. As noted before, this setting enables the telephone switching office to detect dial pulses that will be sent by the dialer 14.

In step S4 the control unit 15 initiates the dialing sequence. In step S5, the control unit 15 waits for one digit to be sent. When the digit has been sent, in step S6 the control unit 15 leaves the main switch A1 at the facsimile position but sets bypass switch A2 to the on-position (1), connecting the telephone set 11 to the telephone line 1 again. This enables the current detector B1 to detect whether the telephone set 11 is still off-hook, or has gone on-hook. The control unit 15 checks the signal output by detector B1 in step S7.

If the telephone set 11 is still off-hook, in step S8 the control unit 15 determines whether dialing has been completed. If dialing is completed, a transition is made to the voice communication mode, which is the same as the standby mode: the main switch A1 is set to the telephone position (1). If dialing is not completed, the control unit 15 turns off the bypass switch A2 in step S9, in preparation for the dialing of the next digit, then returns to step S5.

If the telephone set 11 is found in step S7 to be on-hook, in step S10 the control unit 15 immediately cancels the dialing operation. The facsimile machine 12 then reverts to the standby mode.

Figure 8:
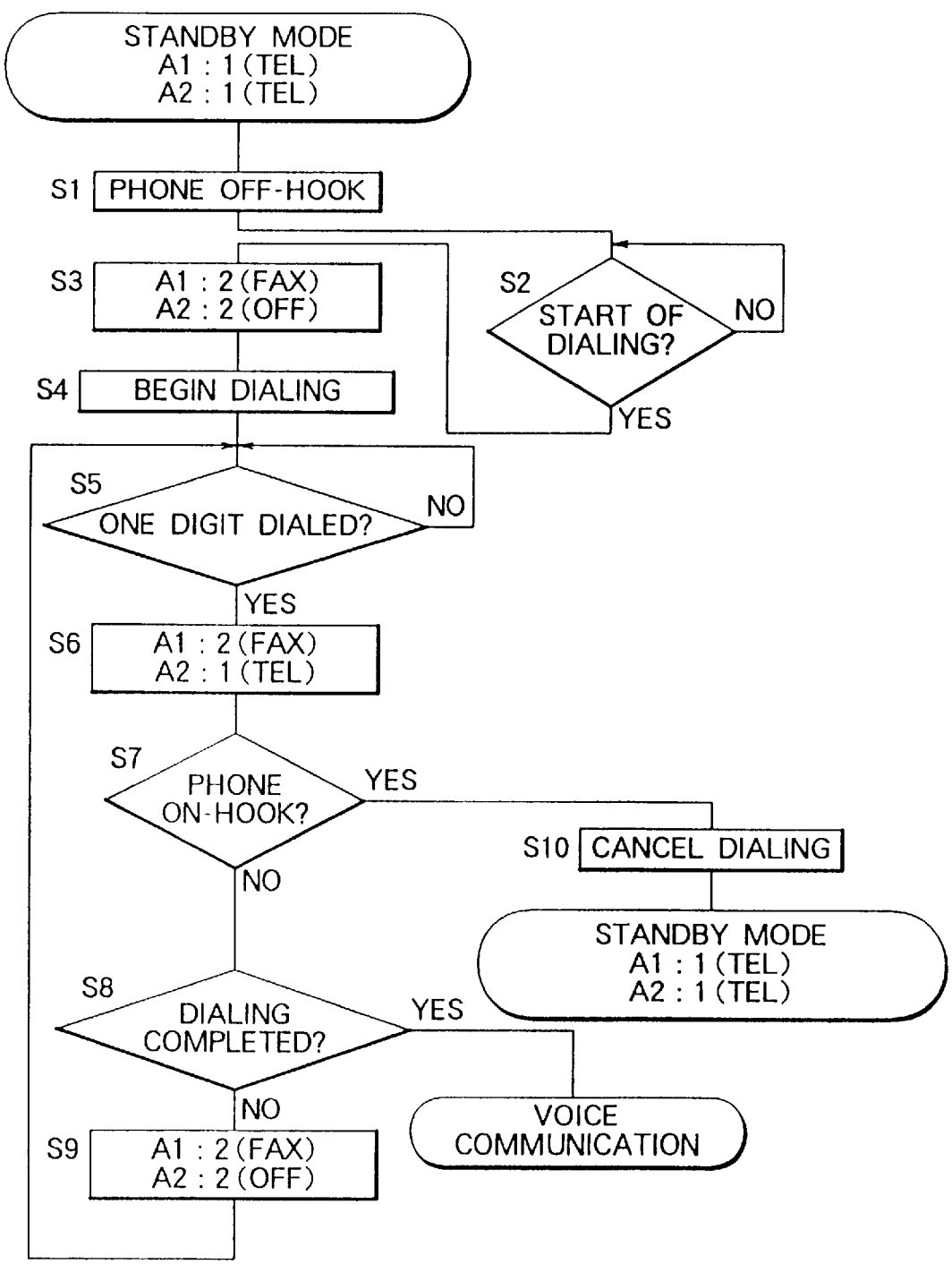
FIG. 8 is a flowchart illustrating an off-hook dialing process.

FIG. 8 can be summarized by saying that the facsimile machine 12 checks the telephone set 11 after dialing each digit, and immediately stops dialing if the user has hung up.

This enables the user to cancel a mistakenly dialed call just by replacing the handset, without having to press a key, even though the call was dialed at the facsimile machine 12.

The invention is not restricted to the embodiment described above, in which a telephone set and facsimile machine are connected to a single telephone line. The invention can be applied when two or more communication terminals of any type are coupled to a single communication line, by detecting the status of one of the communication terminals and controlling the connections of all of the communication terminals accordingly.

Switches 3 and 4 (A1 and A2) may be either electromechanical switches or electronic switches.

Switch 4 (A1) may be configured simply to connect or disconnect the second communication terminal T2 in FIG. 1 (the facsimile apparatus in FIG. 4) from the communication line 1, instead of switching between the first and second communication terminals. It is still possible in that case to couple either one of the communication terminals, or both of the communication terminals, to the communication line, by turning on either one of the two switches, or turning on both switches.

Those skilled in the art will recognize that further modifications are possible within the scope claimed below.

What is claimed is:

1. A switching controller for switching connections between a communication line, a first communication terminal, and a second communication terminal, comprising:

a main switch having a first state that couples said first communication terminal to said communication line, and a second state that couples said second communication terminal to said communication line, the communications line always being coupled to one of the first and second communication terminals by way of the main switch;

a bypass switch coupled in parallel with said main switch between said communication line and said first communication terminal, having an on-state that couples said first communication terminal to said communication line and an off-state that does not couple said first communication terminal to said communication line;

a detector coupled to said first communication terminal, for detecting a status of said first communication terminal when said bypass switch is in said on-state; and a control unit coupled to said detector, for switching said main switch and said bypass switch among a first mode in which said main switch is in said first state, a second mode in which said main switch is in said second state and said bypass switch is in said off-state, and a third mode in which said main switch is in said second state and said bypass switch is in said on-state, and for changing from said third mode to one mode selected from among said first mode and said second mode responsive to the status of said first communication terminal detected by said detector.

2. The switching controller of claim 1, wherein said control unit places said bypass switch in said on-state in said first mode.

3. The switching controller of claim 1, wherein said control unit places said bypass switch in said off-state in said first mode.

4. The switching controller of claim 1, wherein said first communication terminal is a telephone set, said status is a hook status, and said control unit changes from said third mode to said first mode when said first communication terminal goes off-hook.

5. A switching controller for switching connections among a communication line, a facsimile machine that originates and answers calls and sends and receives facsimile signals, and a telephone set, comprising:

a main switch having a first state that couples said telephone set to said communication line, and a second state that couples said facsimile machine to said communication line, the communications line always being coupled to one of the telephone set and the facsimile machine by way of the main switch;

a bypass switch coupled in parallel with said main switch between said communication line and said telephone set, having an on-state that couples said telephone set to said communication line and an off-state that does not couple said telephone set to said communication line;

a detector coupled to said telephone set, for monitoring a hook status of said telephone set when said bypass switch is in said on-state; and a control unit coupled to said detector, for switching said main switch and said bypass switch among a first mode in which said main switch is in said first state, a second mode in which said main switch is in said second state and said bypass switch is in said off-state, and a third mode in which said main switch is in said second state and said bypass switch is in said on-state, and for changing from said third mode to one mode selected from among said first mode and said second mode responsive to the hook status of said telephone set.

6. The switching controller of claim 5, wherein said switching controller is built into said facsimile machine.

7. The switching controller of claim 5, wherein said control unit places said main switch and said bypass switch in said second mode when said facsimile machine originates a call, then changes said main switch and said bypass switch to said third mode.

8. The switching controller of claim 5, wherein said facsimile machine has an auto-answer mode for answering incoming calls automatically, and said control unit places said main switch and said bypass switch in said third mode when said facsimile machine answers a call in said auto-answer mode.

9. The switching controller of claim 5, wherein said control unit changes said main switch and said bypass switch from said third mode to said first mode when said telephone set goes off-hook.

10. The switching controller of claim 5, wherein said control unit places said main switch and said bypass switch in said second mode when said facsimile machine sends a facsimile signal, and also places said main switch and said bypass switch in said second mode when said facsimile machine receives a facsimile signal.

11. The switching controller of claim 5, wherein said facsimile machine originates calls by generating dial pulses representing digits.

12. The switching controller of claim 11, wherein if said facsimile machine originates a call when said telephone set is off-hook, said control unit places said main switch and said bypass switch in said second mode, but changes said main switch and said bypass switch momentarily to said third mode following each digit among said digits, and cancels said call by causing said facsimile machine to stop generating dial pulses if said telephone set is found to be on-hook while said main switch and said bypass switch are in said third mode.

13. A method of controlling the connections of a telephone set and a facsimile machine to a single communication line, comprising the steps of:

always coupling the communications line to at least one of the telephone set and the facsimile machine;

connecting said facsimile machine to said communication line and disconnecting said telephone set from said communication line while said facsimile machine sends dial signals for originating a call while said telephone set is on-hook;

connecting both said telephone set and said facsimile machine to said communication line after said facsimile machine has finished sending said dial signals;

disconnecting said telephone set from said communication line if said facsimile machine receives a facsimile signal; and disconnecting said facsimile machine from said communication line if said telephone set goes off-hook.

14. A method of controlling the connections of a telephone set and a facsimile machine to a single communication line, comprising the steps of:

always coupling the communications line to at least one of the telephone set and the facsimile machine;

connecting said facsimile machine to said communication line and disconnecting said telephone set from said communication line while said facsimile machine sends series of digits for originating a call and said telephone set is off-hook;

momentarily connecting both said telephone set and said facsimile machine to said communication line after each digit in said series of digits;

disconnecting said telephone set from said communication line if said telephone set is still off-hook and said series of digits has not yet been completely sent;

disconnecting said facsimile machine from said communication line and discontinuing sending said series of digits if said telephone set is on-hook; and disconnecting said facsimile machine from said communication line if said series of digits has been completely sent.

* * * * *